(12) United States Patent  
Yoshida et al.

(10) Patent No.: US 9,728,217 B2  
(45) Date of Patent: Aug. 8, 2017

(54) GLASS SUBSTRATE FOR MAGNETIC DISK AND MAGNETIC DISK FOR HEAT ASSISTED MAGNETIC RECORDING

(71) Applicants: HOYA GLASS DISK VIETNAM II LTD., Yen My, Hung Yen Province (VN); HOYA CORPORATION, Shinjuku-ku, Tokyo (JP)

(72) Inventors: Masayoshi Yoshida, Kai (JP); Masahiro Katagiri, Hokuto (JP)

(73) Assignees: HOYA GLASS DISK VIETNAM II LTD., Yen Province (VN); HOYA CORPORATION, Tokyo (JP)

( * ) Notice: Subject to any disclaimer, the term of this patent is extended or adjusted under 35 U.S.C. 154(b) by 0 days.

(21) Appl. No.: 15/029,117

(22) PCT Filed: Oct. 31, 2013

(86) PCT No.: PCT/VN2013/000012  
§ 371 (c)(1),  
(2) Date: Apr. 13, 2016

(87) PCT Pub. No.: WO2015/066735  
PCT Pub. Date: May 7, 2015

(65) Prior Publication Data  
US 2016/0254018 A1 Sep. 1, 2016

(51) Int. Cl.  
*G11B 5/73* (2006.01)  
*G11B 5/72* (2006.01)  
*G11B 5/84* (2006.01)  
*G11B 5/00* (2006.01)

(52) U.S. Cl.  
CPC ............ *G11B 5/722* (2013.01); *G11B 5/7315* (2013.01); *G11B 5/84* (2013.01); *G11B 2005/0021* (2013.01)

(58) Field of Classification Search  
None  
See application file for complete search history.

(56) References Cited

U.S. PATENT DOCUMENTS

| 8,241,516 B2 | 8/2012 | Fujii et al. |
| 8,932,110 B2 | 1/2015 | Sakaguchi et al. |
| 2002/0164505 A1 | 11/2002 | Yokoyama et al. |

(Continued)

FOREIGN PATENT DOCUMENTS

| JP | 06096436 A | * | 4/1994 |
| JP | 2000-207733 A | | 7/2000 |

(Continued)

OTHER PUBLICATIONS

Abstract translation of JP 06-096436 A (pub 1994).*

(Continued)

*Primary Examiner* — Kevin Bernatz  
(74) *Attorney, Agent, or Firm* — Global IP Counselors, LLP

(57) ABSTRACT

A glass substrate for use as a magnetic disk for heat assisted magnetic recording can restrain the occurrence of scratches when a magnetic head is in operation. The glass substrate for the magnetic disk includes a principal face on which an arithmetic average waviness Wa of a wavelength band of 1 to 3 mm is 2.15 Å or less.

4 Claims, 1 Drawing Sheet

(56) References Cited

U.S. PATENT DOCUMENTS

| | | | |
|---|---|---|---|
| 2005/0032465 A1* | 2/2005 | Fujii | G11B 5/7315 |
| | | | 451/41 |
| 2006/0002283 A1* | 1/2006 | Horisaka | G11B 5/8404 |
| | | | 369/272.1 |
| 2007/0003796 A1* | 1/2007 | Isono | C03C 19/00 |
| | | | 428/832 |
| 2009/0161242 A1* | 6/2009 | Aida | G11B 5/7315 |
| | | | 360/31 |
| 2011/0117822 A1 | 5/2011 | Terada et al. | |

FOREIGN PATENT DOCUMENTS

| | | |
|---|---|---|
| JP | 2001-288455 A | 10/2001 |
| JP | 2003-187421 A | 7/2003 |
| JP | 2005-063530 A | 3/2005 |
| JP | 2007-164916 A | 6/2007 |
| JP | 2009-199721 A | 9/2009 |
| JP | 2011-104713 A | 6/2011 |
| JP | 2011-210310 A | 10/2011 |
| JP | 2012-018707 A | 1/2012 |
| JP | 2013-178855 A | 9/2013 |
| WO | 2013145503 A1 | 10/2013 |

OTHER PUBLICATIONS

International Search Report in PCT/VN2013/000012 dated Feb. 25, 2014.
An Office Action in the corresponding Japanese Patent Application No. 2016-516611 dated Jan. 10, 2017.

* cited by examiner

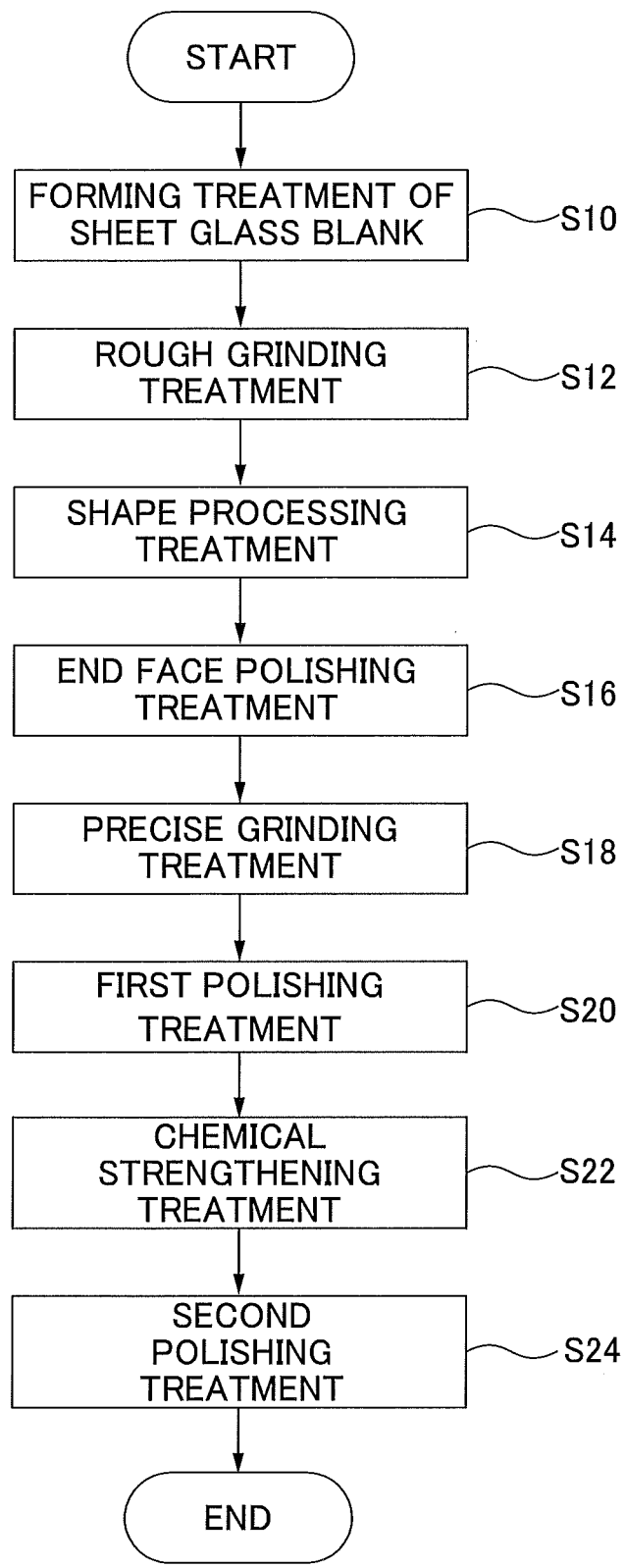

GLASS SUBSTRATE FOR MAGNETIC DISK AND MAGNETIC DISK FOR HEAT ASSISTED MAGNETIC RECORDING

CROSS-REFERENCE TO RELATED APPLICATIONS

This application is a U.S. National stage application of International Patent Application No. PCT/VN2013/000012, filed on Oct. 31, 2013.

BACKGROUND

Field of the Invention

The present invention relates to a glass substrate for a magnetic disk to be a source of a magnetic disk for heat assisted magnetic recording and a magnetic disk for heat assisted magnetic recording.

Background Information

Conventionally, a glass substrates is suitably used for a magnetic disk which is used as one of information recording mediums. Today, in response to the request for increased recording capacity of a hard disk drive (HDD) device, the density of magnetic recording is being increased. Consequently, a magnetic recording information area is micronized by making a flying height of a magnetic head from a magnetic recording surface extremely low. Dimension and form of the glass substrate used for such a magnetic disk are preferably made with high accuracy with respect to a target value.

Especially, the lower a flying height of a magnetic head from a magnetic recording surface becomes, the more scratches on the principal face of a magnetic disk can occur when the magnetic head is in operation, caused by a fine waviness on the principal face of the magnetic disk. Accordingly, it is preferable that the level of the fine waviness on the principal face of a glass substrate for a magnetic disk to be a source of a magnetic disk is decreased.

On the other hand, recently, the heat assisted magnetic recording (HAMR) system is noticed as a technology which further increases the recording capacity. A magnetic disk for heat assisted magnetic recording is obtained by forming at least an adhesive layer, an underlying layer, a magnetic layer (magnetic recording layer), a protective layer, and a lubricant layer on the principal face of a glass substrate for a magnetic disk. As a forming method of a magnetic layer, a method of performing a heat treatment to a glass substrate for a magnetic disk at a temperature close to a glass transition temperature Tg is known (JP 2013-178855 A).

SUMMARY

Generally, a heat treatment for forming a magnetic layer of a magnetic disk for heat assisted magnetic recording is performed in a state that an outer diameter end portion of a glass substrate for a magnetic disk is held by a holding claw. In this state, a fine waviness occurs on the principal face of the glass substrate for a magnetic disk due to a pressure to the outer diameter end portion of the glass substrate for a magnetic disk exerted by the holding claw and heat which is applied in the heat treatment. Due to the fine waviness, the scratch occurrence rate when a magnetic head is in operation is increased.

Thus, the present invention is intended to provide a glass substrate for a magnetic disk to be a source of a magnetic disk for heat assisted magnetic recording and a magnetic disk for heat assisted magnetic recording which can restrain the occurrence of scratches when a magnetic head is in operation.

As a result of intensive studies in order to solve the above-described conventional problems, the present inventor has found that the occurrence of scratches can be restrained when a magnetic disk for heat assisted magnetic recording is made from a glass substrate for a magnetic disk whose level of the fine waviness of a wavelength band of 1 to 3 mm on the principal face thereof is decreased.

From the above, a first aspect of the present invention is a glass substrate for a magnetic disk to be a source of a magnetic disk for heat assisted magnetic recording. In the glass substrate, an arithmetic average waviness Wa of the wavelength band of 1 to 3 mm on the principal face thereof is 2.15 Å or less.

A second aspect of the present invention is a glass substrate for a magnetic disk to be a source of a magnetic disk for heat assisted magnetic recording. An arithmetic average waviness Wa of the wavelength band of 1 to 3 mm on the principal face of the glass substrate is a predetermined value or less, the predetermined value being a value in which scratches upon the magnetic head operation do not occur on the principal face of the magnetic disk when actuating the magnetic disk on a hard disk drive device.

A third aspect of the present invention is a magnetic disk for heat assisted magnetic recording which is made by performing a heat treatment to the above-mentioned glass substrate for a magnetic disk.

According to the present invention, the occurrence of scratches of a magnetic disk for heat assisted magnetic recording can be restrained by setting an arithmetic average waviness Wa of the wavelength band of 1 to 3 mm on the principal face of a glass substrate for a magnetic disk to a value in which scratches upon the magnetic head operation do not occur on the principal face of the magnetic disk or less.

BRIEF DESCRIPTION OF THE DRAWINGS

FIG. 1 is a drawing illustrating an example of the flow of the method of manufacturing the glass substrate for a magnetic disk of this embodiment.

DESCRIPTION OF EMBODIMENTS

A glass substrate for a magnetic disk of this embodiment will be specifically described hereunder.

[The Glass Substrate for a Magnetic Disk]

Aluminosilicate glass, soda lime glass, boron silicate glass, or the like can be used as materials of the glass substrate for a magnetic disk in this embodiment. Especially, aluminosilicate glass including cations such as alkali metal ions can be suitably used in that chemical strengthening can be performed and a glass substrate for a magnetic disk which is excellent in flatness of the principal face and strength of the substrate can be made.

The composition of the glass substrate for a magnetic disk of this embodiment includes one or more kinds of alkali earth metal oxide selected from a group composed of $SiO_2$, $Li_2O$, $Na_2O$, and MgO, CaO, SrO, and BaO, as the essential components. The molar ratio of the content of CaO with respect to the total content of MgO, CaO, SrO, and BaO (CaO/(MgO+CaO+SrO+BaO)) is 0.20 or less, and a glass transition temperature Tg may be 650° C. or higher. The glass substrate for a magnetic disk composed in this composition is suitable for a glass substrate for a magnetic disk used for a magnetic disk for heat assisted magnetic recording.

The glass substrate for a magnetic disk in this embodiment is an annular thin glass substrate. In this embodiment, although any size of the glass substrate for a magnetic disk can be employed, a glass substrate for a magnetic disk of 2.5 to 3.5 inches in nominal diameter is preferably employed. Compared to a glass substrate which is 2.5 inches in nominal diameter, a glass substrate which is 3 inches or more in nominal diameter is larger in area and volume, and is heavier. Accordingly, since pressure exerted to the glass substrate by a holding claw thereof becomes stronger, a fine waviness due to the holding claw is easy to occur. Thus, in the case of using the glass substrate which is 3 inches or more in nominal diameter, applying the present invention is especially effective.

[Method of Manufacturing the Glass Substrate for a Magnetic Disk]

FIG. 1 is a drawing illustrating an example of the flow of the method of manufacturing the glass substrate for a magnetic disk of this embodiment. As illustrated in FIG. 1, in the manufacturing method of this embodiment, firstly, a forming treatment of a sheet glass blank having a pair of principal faces (S10) is performed. Next, a rough grinding treatment of this glass blank (S12) is performed. Then, a shape processing treatment (S14) and an end face polishing treatment (S16) are applied to the glass blank. Then, a precise grinding treatment (S18) using fixed abrasive grains is performed to the glass substrate obtained from the glass blank. Then, a first polishing treatment (S20), a chemical strengthening treatment (S22), and a second polishing treatment (S24) are performed to the glass substrate after the precise grinding treatment (S18.) Note that, although this embodiment is described according to the flow in FIG. 1, not all of the treatments of the flow (S10 to S24) in FIG. 1 are necessary and some of the treatments are optional. Additionally, it is also possible to change the order of some of the treatments. Each treatment will be described hereunder.

(a) Forming Treatment of a Glass Blank

In the forming of a glass blank, a press forming method, for example, can be used. A round glass blank can be obtained through the press forming method. Further, it can be manufactured using known manufacturing methods such as a down-draw method, a redraw method, a fusion method or the like. A disk-shaped glass substrate to be a source of the glass substrate for a magnetic disk can be obtained by appropriately performing shape processing to the sheet glass blank made through these known manufacturing methods.

(b) Rough Grinding Treatment

In the rough grinding treatment, specifically, grinding of the principal faces on both sides of the glass blank is performed while holding the glass blank in a holding hole which is provided in a holding member mounted on a double faces grinding apparatus. For example, loose abrasive grains are used as grinding materials. In the rough grinding treatment, the glass blank is grinded so as to approach close to a target dimension of plate thickness and a target flatness of the principal faces. Note that the rough grinding treatment is performed according to dimension accuracy or surface roughness of the formed glass blank, and in some cases, it does not have to be performed.

(c) Shape Processing Treatment

Next, the shape processing treatment is performed. In the shape processing treatment, after the forming treatment of the glass blank, a disk-shaped glass substrate having a round hole is obtained by forming the round hole using a known processing method. After that, chamfering of an end face of the glass substrate is conducted whereby a side wall face orthogonal to the principal faces and a chamfering face (intervening face) which connects the side wall face and the principal faces are formed on the end face of the glass substrate.

(d) End Face Polishing Treatment

Next, the end face polishing treatment of the glass substrate is performed. In the end face polishing treatment, polishing is performed by supplying polishing solution including loose abrasive grains between a polishing brush and the end face of the glass substrate and moving the polishing brush and the glass substrate relatively. In the end face polishing, the inner circumferential end face and the outer circumferential end face of the glass substrate are objects to be polished, and the inner circumferential end face and the outer circumferential end face become a mirror state.

(e) Precise Grinding Treatment

Next, the precise grinding treatment is exerted to the principal faces of the glass substrate. Specifically, grinding is performed to the principal faces of the glass substrate using the double faces grinding apparatus. The double faces grinding apparatus has a pair of upper and lower surface plates (upper surface plate and lower surface plate), and the fixed abrasive grains including diamond abrasive grains, for example, are attached to the faces of the upper surface plate and the lower surface plate. As the abrasive grains, particles of diamond or the like and an aggregate obtained by binding a plurality of particles with a binder such as glass, ceramic, metal, or resin or the like can be used. For example, a sheet on which a pellet fixed with the abrasive grains using a supporting member such as resin or the like is attached can be the fixed abrasive grain. The grass substrate is clamped between such upper surface plate and lower surface plate. The both principal faces of this glass substrate can be grinded by movably operating either the upper surface plate or the lower surface plate, or both of them while supplying coolant so as to relatively move the glass substrate and each surface plate. In the grinding treatment of this embodiment, the principal faces of the glass substrate are grinded by making the grinding face including the fixed abrasive grains and the principal faces of the glass substrate contact with each other, while grinding using the loose abrasive grains can also be performed.

(f) First Polishing Treatment

Next, the first polishing treatment is exerted to the principal faces of the glass substrate. Specifically, mirror surface polishing is performed to the principal faces of the glass substrate using the double faces polishing apparatus. The first polishing treatment can be performed by clamping the principal faces of the glass substrate with polishing pads attached to the upper and lower surface plates, supplying the polishing solution including loose abrasive grains between the glass substrate and the polishing pads, and relatively moving the grass substrate and the principal faces. At this time, it is preferable to hold the glass substrate with a holder such as a carrier or the like and relatively move it by a planetary gear movement because the principal faces of the glass substrate can be uniformly polished. The first polishing removes cracks and distortions which remain on the principal faces when grinding by the fixed abrasive grains, for example, is performed, or fine surface unevenness which occurs on the principal faces by a crystallizing treatment. The removal amount is preferably 1 to 100 μm. By setting the removal amount within the above stated range, surface roughness of the principal faces, for example arithmetic average roughness Ra can be decreased while preventing the shape of the end faces of the principal faces from excessively sinking or protruding.

In the first polishing treatment of this embodiment, polishing of the principal faces of the glass substrate is performed setting the polishing condition of the first polishing treatment so as to be 2.15 Å or less in arithmetic average waviness Wa of the wavelength band of 1 to 3 mm on the principal faces of the glass substrate for a magnetic disk. Specifically, as the condition of the first polishing treatment, the polishing condition is determined so as to decrease the arithmetic average waviness Wa of the wavelength band of 1 to 3 mm on the principal faces of the glass substrate for a magnetic disk. For example, the arithmetic average waviness Wa of the wavelength band of 1 to 3 mm on the principal faces of the glass substrate for a magnetic disk can be decreased by using a polishing pad which is 3 μm or less in surface waviness of the wavelength band of 1 to 3 mm on the surface of the polishing pad.

Additionally, from the point of view of suppressing polishing speed and occurrences of scratches, it is preferable that the polishing solution includes particles of $CeO_2$, $ZrO_2$, and $SiO_2$ or the like as abrasive grains. Further, the average particle diameter (D50) of the abrasive grains is preferably 0.3 to 3.0 μm. Furthermore, the force which presses the glass substrate with the polishing pad is preferably 30 to 200 g/cm$^2$.

(g) Chemical Strengthening Treatment

The glass substrate can be chemically strengthened appropriately. As chemical strengthening solution, molten solution which is obtained by heating, for example, potassium nitrate, sodium nitrate, or their mixture can be used. Then, by soaking the glass substrate into the chemical strengthening solution, lithium ions and sodium ions in the glass composition in the surface layer of the glass substrate are replaced with sodium ions and potassium ions which are relatively large in ion diameter in the chemical strengthening solution respectively whereby a compressive stress layer is formed in the surface layer portion, thereby strengthening the glass substrate. Although timing of performing the chemical strengthening treatment can be determined appropriately, it is especially preferable to perform the polishing treatment after the chemical strengthening treatment because the surface can be smoothed and foreign matters sticking to the surface of the glass substrate can be removed by the chemical strengthening treatment. Moreover, the chemical strengthening treatment may be performed as needed and it does not have to be performed.

(h) Second Polishing Treatment (Last Polishing)

Next, the second polishing is exerted to the glass substrate after the chemical strengthening treatment. The second polishing is intended for the mirror surface polishing of the principal faces. The double faces polishing apparatus which has the identical configuration to the double faces polishing apparatus used for the first polishing is used in the second polishing as well. In the second polishing treatment, it is preferable to make the particle size of the loose abrasive grains smaller compared to the first polishing treatment. Additionally, it is preferable to lower the hardness of a resin polisher of the polishing pad. Additionally, in the second polishing treatment, it is preferable to lessen the removal amount than in the first polishing treatment. Thereby, roughness of the principal faces can be decreased while preventing the shape of the end portions of the principal faces from excessively sinking or protruding.

As for the polishing pad used in the second polishing treatment, it is preferable to use a polishing pad which is 3 μm or less in surface waviness of the wavelength band of 1 to 3 mm on the surface of the polishing pad similarly to the first polishing treatment. In the second polishing treatment as well, the arithmetic average waviness Wa of the wavelength band of 1 to 3 mm can be further decreased by using the polishing pad which is 3 μm or less in surface waviness of the wavelength band of 1 to 3 mm on the surface of the polishing pad.

As the loose abrasive grains used for the second polishing treatment, for example, fine particles such as colloidal silica or the like are used. The glass substrate for a magnetic disk can be obtained by washing the polished glass substrate.

It is preferable to perform the second polishing treatment in that the level of surface unevenness on the principal faces of the glass substrate can be further smaller. The glass substrate exerted with the second polishing becomes the glass substrate for a magnetic disk in this manner.

[Magnetic Disk for Heat Assisted Magnetic Recording]

The magnetic disk for heat assisted magnetic recording (hereunder, referred to as "magnetic disk") is constituted in such a way that at least an adhesive layer, an underlying layer, a magnetic layer (magnetic recording layer), a protective layer, and a lubricant layer are stacked on the principal faces of the glass substrate for a magnetic disk in the order closer to the principal faces. For example, the glass substrate for a magnetic disk is introduced into a film forming apparatus which has been vacuumed, and layers are sequentially formed on the principal faces of the glass substrate for a magnetic disk from the adhesive layer to the magnetic layer in an Ar atmosphere by a DC magnetron sputtering method. As the adhesive layer, for example, CrTi can be used, and as the underlying layer, for example, CrRu can be used.

The magnetic layer is formed by heat treatment using, for example, CoPt based alloy and FePt based alloy of $L_{10}$ regular structure. In this heat treatment, it is heated for about 1 to 60 minutes at 300 to 700° C. while holding an outer diameter end portion of the glass substrate for a magnetic disk. Note that, it just needs to be heated so that the $L_{10}$ regular structure occurs, and this is not the only case. Note that the glass transition temperature Tg of the glass substrate for a magnetic disk of this embodiment is 650° C. At this time, the fine waviness on the principal faces of the magnetic disk increases due to the pressure applied by the holding claw to the outer diameter end portion of the glass substrate for a magnetic disk and the heat added in the heat treatment.

After the film is formed as described above, the protective layer is formed using $C_2H_4$ through a CVD method, for example, then, a nitrogen treatment of introducing nitrogen to the surface is performed whereby a magnetic recording medium for heat assisted magnetic recording can be formed. After that, the lubricant layer can be formed by applying a PFPE (perfluoroalkylpolyether) on the protective layer through a dip-coating method.

The present inventor has found that the wavelength band of the fine waviness on the principal faces of a magnetic disk which is aggravated by the heat treatment above is 1 to 3 mm wide. Therefore, in this embodiment, the glass substrate for a magnetic disk is made in such a way that the level of the fine waviness on the principal faces of the wavelength band of 1 to 3 mm is low (in other words, a margin is provided in the fine waviness on the principal faces of the wavelength band of 1 to 3 mm) in advance, considering that the fine waviness on the principal faces of the wavelength band of 1 to 3 mm is aggravated by the above-described heat treatment. Specifically, as shown in the example described later, the glass substrate for a magnetic disk in which the arithmetic average waviness Wa of the wavelength band of 1 to 3 mm on the principal faces of the glass substrate for a magnetic disk is the value at which scratches upon the magnetic head operation do not occur on the principal faces of a magnetic disk (2.15 Å) or less is made, and the heat treatment is performed to this glass substrate for a magnetic disk to make the magnetic disk. Accordingly, even though the fine waviness on the principal faces of the magnetic disk is aggravated, the occurrence of the scratches on the principal faces of the magnetic disk upon magnetic head operation can be restrained when actuating the magnetic disk on a HDD apparatus.

Example, Comparative Example

In order to confirm the effects of the glass substrate for a magnetic disk of this embodiment, six types of glass substrates for magnetic disks whereof the arithmetic average waviness Wa of the wavelength band of 1 to 3 mm on the principal faces were different from each other (glass substrates for magnetic disks of examples 1 and 2, and comparative examples 1 to 4) were made, magnetic disks were made from respective glass substrates for magnetic disks (magnetic disks of examples 1 and 2, and comparative examples 1 to 4) to measure the scratch occurrence rate with respect to respective magnetic disks.

The glass material with the following composition was used as a material of the glass substrate for respective magnetic disks: $SiO_2$ of 65 mol %, $Al_2O_3$ of 6 mol %, $Li_2O$ of 1 mol %, $Na_2O$ of 9 mol %, MgO of 17 mol %, $ZrO_2$ of 2 mol %, and the glass transmission temperature being 671° C.

Each grass substrate for a magnetic disk was made by applying the flow of FIG. 1 to the above-mentioned glass material. Note that the glass substrates for magnetic disks of the examples 1 and 2 were separately made by performing the first polishing treatment using the polishing pad which was 3 μm or less in surface waviness of the wavelength band of 1 to 3 mm on the surface of the polishing pad so that the arithmetic average waviness Wa of the wavelength band of 1 to 3 mm on the principal faces were 2.15 Å and 2.11 Å, respectively. The glass substrate for magnetic disks of the comparative examples 1 to 4 were selectively made by performing the first polishing treatment using a polishing pad which was 5 μm or more in surface waviness of the wavelength band of 1 to 3 mm on the surface of the polishing pad so that the arithmetic average waviness Wa of the wavelength band of 1 to 3 mm on the principal faces of the glass substrate were 4.34 Å, 2.56 Å, 3.16 Å, and 3.80 Å, respectively. Also note that the average value of a region of 15.0 to 31.5 mm in diameter was employed for the arithmetic average waviness Wa on the principal faces of the glass substrate.

Each magnetic disk was made by sequentially forming layers on the principal faces of each glass substrate for a magnetic disk from the adhesive layer to the magnetic layer. Especially, the magnetic layer was formed after forming the FePt based alloy by heating it so as to be the $L_{10}$ regular structure in a state that the outer diameter end portion of the glass substrate for a magnetic disk was held by the holding claw.

The scratch occurrence rates were measured using a laser type optical surface analyzer (OSA) by confirming whether scratches existed on the principal faces of the magnetic disks after repeating the basic sequence to be hereinafter described 36 times to each disk of the examples 1 and 2 as well as the comparative examples 1 to 4 which were prepared 60 pieces for each as samples. In the basic sequence, while rotating each magnetic disk at 7200 rpm, a head for evaluation was kept flying at a fixed position of 22.0 mm in radius for one hour, then seeking in the range of 15.0 to 31.0 mm in radius for one hour was performed.

As a result, with respect of the examples 1 and 2 as well as the comparative examples 1 to 4, the results as illustrated in Table 1 were obtained regarding the relation between the arithmetic average waviness Wa on the principal faces of the glass substrate for a magnetic disk and the scratch occurrence rate (the number of magnetic disks on which scratches occur/the number of samples.)

TABLE 1

| | Arithmetic average waviness Wa [Å] | | |
| --- | --- | --- | --- |
| | Less than 1 mm of wavelength band | 1 to 3 mm of wavelength band | Scratch occurrence rate [%] |
| Example 1 | 1.54 | 2.15 | 0 |
| Example 2 | 1.59 | 2.11 | 0 |
| Comparative example 1 | 1.60 | 4.34 | 30 |
| Comparative example 2 | 1.56 | 3.80 | 30 |
| Comparative example 3 | 1.53 | 3.16 | 20 |
| Comparative example 4 | 1.57 | 2.56 | 15 |

Table 1 illustrates that the smaller the arithmetic average waviness Wa of the wavelength band of 1 to 3 mm on the principal faces of the glass substrate for a magnetic disk was, the less scratches of the magnetic disk occurred, and no scratch occurred when the arithmetic average waviness Wa was 2.15 Å or less. Additionally, it also illustrates that the arithmetic average waviness Wa of the wavelength band of less than 1 mm on the principal faces of the glass substrate for a magnetic disk did not influence the occurrence of scratches. Also, no correlation between the arithmetic average waviness on the principal faces of the glass substrate for a magnetic disk with the wavelength band longer than 3 mm and the scratch occurrence rate was found.

The details have been described with respect to the glass substrate for a magnetic disk and the magnetic disk of the present invention as above. However, the present invention is not limited to the above-described embodiment, and various improvements and modifications can be undoubtedly performed within a range not deviating from the gist of the present invention.

The invention claimed is:

1. A glass substrate for a magnetic disk to be a source of a magnetic disk for heat assisted magnetic recording, the glass substrate comprising:
   a principal face on which an arithmetic average waviness Wa of a wavelength band of 1 mm to 3 mm is 2.15 Å or less; and
   a glass transition temperature of the glass substrate being 650° C. or higher.

2. A magnetic disk for heat assisted magnetic recording made by performing a heat treatment to the glass substrate for the magnetic disk according to claim 1.

3. A glass substrate for a magnetic disk to be a source of a magnetic disk for heat assisted magnetic recording, the glass substrate comprising:
   a principal face on which an arithmetic average waviness Wa of a wavelength band of 1 mm to 3 mm is a predetermined value or less, the predetermined value representing a scratch occurrence rate of 0% on the principal face of the magnetic disk while actuating the magnetic disk on a hard disk drive device using the following testing:

the scratch occurrence rate being measured using a laser type optical surface analyzer (OSA) after repeating the following basic sequence 36 times on the magnetic disk:

rotating the magnetic disk at 7200 rpm, with a head for evaluation kept flying at a fixed position of 22.0 mm in radius for one hour, then seeking in the range of 15.0 to 31.0 mm in radius for one hour.

4. A magnetic disk for heat assisted magnetic recording made by performing a heat treatment to the glass substrate for the magnetic disk according to claim 3.

* * * * *